US012221322B2

(12) United States Patent
Cao et al.

(10) Patent No.: US 12,221,322 B2
(45) Date of Patent: Feb. 11, 2025

(54) METHOD AND APPARATUS FOR MONITORING ELEVATOR DOOR-OPENING OPERATION FAULT

(71) Applicant: SHENZHEN TECHNOLOGY UNIVERSITY, Shenzhen (CN)

(72) Inventors: Jianmin Cao, Shenzhen (CN); Ruize Sun, Shenzhen (CN); Lei Wang, Shenzhen (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 1284 days.

(21) Appl. No.: 16/770,632

(22) PCT Filed: Dec. 21, 2018

(86) PCT No.: PCT/CN2018/122646

§ 371 (c)(1),
(2) Date: Jun. 8, 2020

(87) PCT Pub. No.: WO2020/124546

PCT Pub. Date: Jun. 25, 2020

(65) Prior Publication Data

US 2021/0221644 A1 Jul. 22, 2021

(51) Int. Cl.
*B66B 5/02* (2006.01)
*B66B 1/06* (2006.01)
*B66B 1/34* (2006.01)
*B66B 5/00* (2006.01)

(52) U.S. Cl.
CPC .................. *B66B 5/02* (2013.01); *B66B 1/06* (2013.01); *B66B 5/0031* (2013.01); *B66B 1/3415* (2013.01); *B66B 5/0006* (2013.01)

(58) Field of Classification Search
CPC ........... B66B 5/02; B66B 1/06; B66B 5/0031; B66B 1/3415; B66B 5/0006
See application file for complete search history.

(56) References Cited

U.S. PATENT DOCUMENTS

2018/0086605 A1* 3/2018 Saarela .................... B66B 13/22
2018/0362293 A1* 12/2018 Mustonen ............... B66B 5/027
2020/0055697 A1* 2/2020 Schmidt ................ B66B 1/3446

* cited by examiner

*Primary Examiner* — Jeffrey Donels

(57) ABSTRACT

The present invention discloses a method and an apparatus for monitoring an elevator door-opening operation fault. The method includes: acquiring elevator control signals from a serial interface between an elevator controller and a control box by using a preset data acquisition device, wherein the elevator control signals include an elevator operation signal, an elevator door control signal, an elevator internal call signal and an elevator floor signal; monitoring whether there is an elevator door fault in the elevator based on the elevator operation signal, the elevator door control signal and the elevator floor signal; when there is the elevator door fault in the elevator and the elevator internal call signal is in a preset level state, determining that there is the elevator door-opening operation fault in the elevator. The present invention is lower in use cost and may be easily popularized and applied.

10 Claims, 4 Drawing Sheets

METHOD AND APPARATUS FOR MONITORING ELEVATOR DOOR-OPENING OPERATION FAULT

TECHNICAL FIELD

The present invention relates to the technical field of elevators, in particular to a method and an apparatus for monitoring an elevator door-opening operation fault.

BACKGROUND

Elevators are main devices for users to travel in high-rise buildings and bring the great convenience for people to travel. Meanwhile, the safety problems of the elevators have become the focus of social attention. For example, the elevators have begun to run when elevator doors have not yet been closed, which not only seriously affects the normal use of the elevators, but also causes huge potential safety hazard. How to detect the elevator door-opening operation fault for the first time so as to deal with it (perform rescue) in time has become an important research subject.

At present, in order to be able to detect the elevator door-opening operation fault for the first time, an elevator door detector is usually additionally provided in an elevator room. When the elevator operates, it is detected whether the elevator door is still in an open state. However, since the elevator door detector is difficult to popularize and apply due to complicated installation process and higher installation cost.

Technical Problem

The present invention provides a method and an apparatus for monitoring an elevator door-opening operation fault, which may solve the technical problem that a method for detecting the elevator door-opening operation fault in the prior art is difficult to popularize and apply.

Technical Solution

A first aspect of the present invention provides a method for monitoring an elevator door-opening operation fault, including:

acquiring elevator control signals from a serial interface between an elevator controller and a control box by using a preset data acquisition device, wherein the elevator control signals include an elevator operation signal, an elevator door control signal, an elevator internal call signal and an elevator floor signal;

monitoring whether there is an elevator door fault in an elevator based on the elevator operation signal, the elevator door control signal and the elevator floor signal; and when there is the elevator door fault in the elevator and the elevator internal call signal is in a preset level state, determining that there is an elevator door-opening operation fault in the elevator.

Optionally, the step of monitoring whether there is an elevator door fault in an elevator based on the elevator operation signal, the elevator door control signal and the elevator floor signal includes:

monitoring a working state of the elevator based on the elevator operation signal;

detecting a change in the elevator door control signal during a time period from the time when the elevator enters a stop state from an operation state to the time when the elevator returns from the stop state to the operation state; and determining whether there is an elevator door fault in the elevator according to the change in the elevator door control signal during the time period and the elevator floor signal.

Optionally, the determining whether there is an elevator door fault in the elevator according to the change in the elevator door control signal during the time period and the elevator floor signal includes:

determining an operation speed of the elevator based on the elevator floor signal; and when determining that a level state of the elevator door control signal remains unchanged during the time period and the operation speed of the elevator is greater than a preset operation speed threshold, determining that there is an elevator door fault in the elevator.

Optionally, the data acquisition device includes a photoelectric isolator and a data acquisition single chip microcomputer, wherein the serial interface, the photoelectric isolator and the data acquisition single chip microcomputer are sequentially connected.

The step of acquiring elevator control signals from a serial interface between an elevator controller and a control box by using a preset data acquisition device includes:

acquiring the elevator control signals from the serial interface by the data acquisition single chip microcomputer, wherein the elevator control signals are transmitted from the serial interface to the data acquisition single chip microcomputer after passing through the photoelectric isolator.

Optionally, after the step of determining that there is a door-opening operation fault in the elevator, the method further includes:

triggering a preset warning apparatus, and/or transmitting preset warning information to an associated rescue system.

A second aspect of the present invention provides an apparatus for monitoring an elevator door-opening fault, which includes:

an acquiring module, which is configured to acquire elevator control signals from a serial interface between an elevator controller and a control box by using a preset data acquisition device, wherein the elevator control signals include an elevator operation signal, an elevator door control signal, an elevator internal call signal and an elevator floor signal;

a monitoring module, which is configured to monitor whether there is an elevator door fault in an elevator based on the elevator operation signal, the elevator door control signal and the elevator floor signal; and a determining module, which is configured to: when there is the elevator door fault in the elevator and the elevator internal call signal is in a preset level state, determine that there is an elevator door-opening operation fault in the elevator.

Optionally, the monitoring module includes:

a state determining module, which is configured to monitor a working state of the elevator based on the elevator operation signal;

a signal detecting module, which is configured to detect a change in the elevator door control signal during a time period from the time when the elevator enters a stop state from an operation state to the time when the elevator returns from the stop state to the operation state; and a signal determining module, which is configured to determine whether there is an elevator door fault in the elevator according to the change in the elevator door control signal during the time period and the elevator floor signal.

Optionally, the signal determining module includes:

a speed detecting and determining module, which is configured to determine an operation speed of the elevator based on the elevator floor signal; and a second determining module, which is configured to: when determining that a level state of the elevator door control signal remains unchanged during the time period and the operation speed of the elevator is greater than a preset operation speed threshold, determine that there is an elevator door fault in the elevator.

Optionally, the data acquiring device includes a photoelectric isolator and a data acquisition single chip microcomputer, wherein the serial interface, the photoelectric isolator and the data acquisition single chip microcomputer are sequentially connected.

The acquiring module is specifically configured to:

acquire the elevator control signals from the serial interface by the data acquisition single chip microcomputer, wherein the elevator control signals are transmitted from the serial interface to the data acquisition single chip microcomputer after passing through the photoelectric isolator.

Optionally, the apparatus further includes:

a warning module, which is configured to trigger a preset warning apparatus, and/or transmit preset warning information to an associated rescue system after determining that there is the elevator door-opening operation fault in the elevator.

Technical Effect

The present invention provides a method for monitoring an elevator door-opening operation fault. The method includes: acquiring elevator control signals from a serial interface between an elevator controller and a control box by using a preset data acquisition device, wherein the elevator control signals include an elevator operation signal, an elevator door control signal, an elevator internal call signal and an elevator floor signal; monitoring whether the elevator has an elevator door fault based on the elevator operation signal, the elevator door control signal and the elevator floor signal; and when the elevator has the elevator door fault and the elevator internal call signal is in a preset level state, determining that there is an elevator door-opening operation fault in the elevator. Accordingly, the present invention may accurately detect the elevator door-opening operation fault by acquiring the elevator control signals from the serial interface between the elevator controller and the control box without additionally installing an elevator door detector, and is lower in use cost. Meanwhile, since the elevator controller generally has a unified serial interface, the method may be easily popularized and applied.

DESCRIPTION OF THE EMBODIMENTS

In order to make the objective, features and advantages of the present invention more obvious and understandable, the technical solutions in embodiments of the present invention will be described clearly and completely in conjunction with accompanying drawings in the embodiments of the present invention. The described embodiments are only a part of embodiments, but not all the embodiments of the present invention. Based on the embodiments of the present invention, all other embodiments obtained by those skilled in the art without making creative efforts fall within the protection scope of the present invention.

Figure 1:
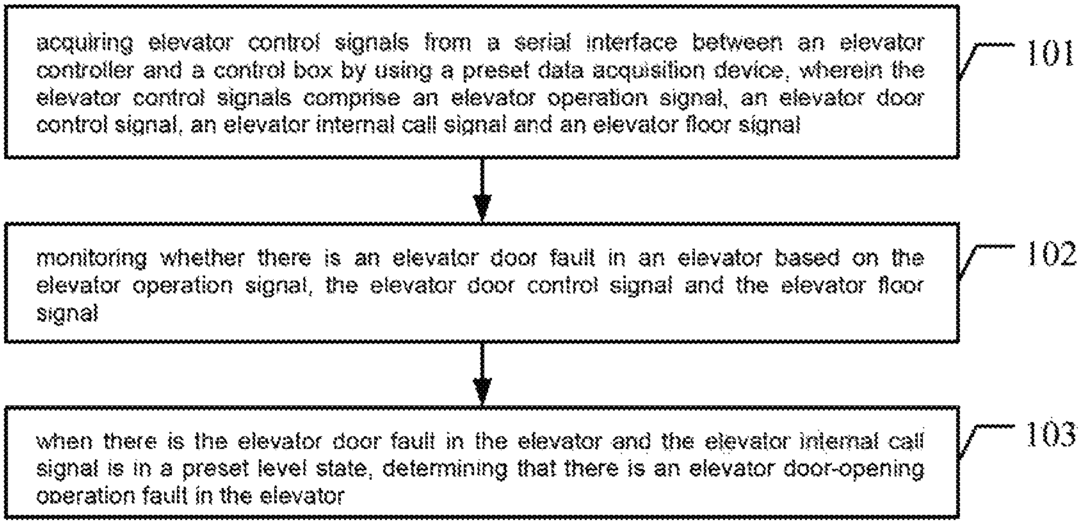
FIG. 1 is a schematic flow diagram of a method for monitoring an elevator door-opening operation fault in an embodiment of the present invention.

An embodiment of the present invention provides a method for monitoring an elevator door-opening operation fault. Reference is made to FIG. 1, which is a schematic flow diagram of a method for monitoring an elevator door-opening operation fault in an embodiment of the present invention. The method for monitoring the elevator door-opening operation fault includes the following steps.

In step 101, elevator control signals are acquired from a serial interface between an elevator controller and a control box by using a preset data acquisition device, wherein the elevator control signals include an elevator operation signal, an elevator door control signal, an elevator internal call signal and an elevator floor signal.

Figure 2:
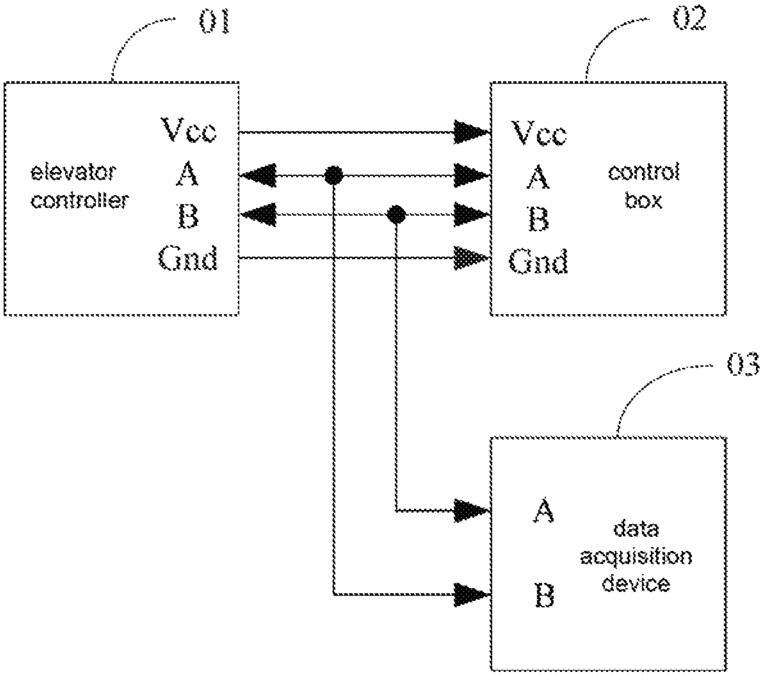
FIG. 2 is a schematic diagram of a connection of a data acquisition device and a serial interface of an elevator controller in an embodiment of the present invention.

Among them, the serial interface (such as a RS485 interface) is generally used between the elevator controller and the control box in the elevator to transmit the elevator control signals. Specifically, reference is made to FIG. 2, which is a schematic diagram of a connection of a data acquisition device and a serial interface of an elevator controller in an embodiment of the present invention. In FIG. 2, there are connections of power supplies Vec for the elevator controller 01 and the control box 02 in an elevator and a ground Gnd as well as connections A and B for data transmission. Among them, data may be transmitted bidirectionally between the connections A and B.

In this embodiment, the data acquisition device 03 is connected with serial data lines A and B between the elevator controller 01 and the control box 02, so that the elevator control signals when the elevator operates may be acquired.

Among them, the above-mentioned elevator control signals include an elevator operation signal, an elevator door control signal, an elevator internal call signal and an elevator floor signal.

Particularly, the elevator operation signal is transmitted by the elevator controller to the control box, and is used to indicate whether the elevator is in an operation state or a stop state.

The elevator door control signal is transmitted from the control box to the elevator controller, and is used to indicate whether an elevator door is in an open state or a closed state.

The elevator internal call signal is generated after a control button inside the elevator is triggered, transmitted from the control box to the elevator controller, and used to indicate that someone in the elevator controls the elevator.

The elevator floor signal is transmitted from the control box to the elevator controller. The elevator controller automatically calculates a position (floor) in which the elevator is located according to the elevator floor signal, and returns a floor number to the control box to remind a user of the floor where the elevator stops.

In the embodiment of the present invention, since the elevator control signals are obtained from the serial interface between the elevator controller and the control box, the present invention is easy to popularized due to the relatively-unified serial interface of the elevator. Meanwhile, the elevator control signals are acquired in real time via the serial interface, and therefore the present invention has no shortcoming of concealing a fault signal by the elevator manufacturer, and is high in accuracy. Moreover, the data acquisition device may be directly hitched to the serial interface of the elevator, and therefore, the present invention has the characteristics of simple installation and low cost.

In step 102, it is monitored whether there is an elevator door fault in the elevator based on the elevator operation signal, the elevator door control signal, and the elevator floor signal.

Figure 3:
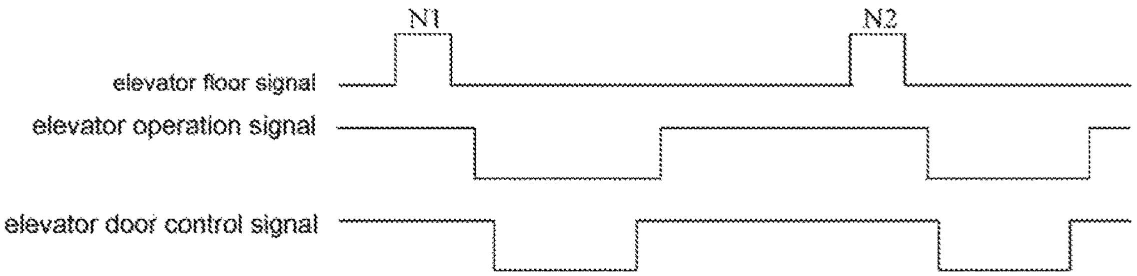
FIG. 3 is a schematic diagram of a change in elevator control signals when an elevator normally operates in an embodiment of the present invention.

Reference is made to FIG. 3, which is a schematic diagram of a change in elevator control signals when an elevator normally operates in an embodiment of the present invention.

In FIG. 3, when the elevator operates to a certain floor, the control box will transmit the elevator floor signal. After receiving the elevator floor signal, the elevator controller calculates a current floor number (N1) and feeds it back to the control box for being displayed. Meanwhile, the elevator starts to decelerate and stop operating, the elevator operation signal changes from a high level to a low level, indicating that the elevator is in a stop state. Then, the elevator door control signal changes from a high level to a low level, indicating that an elevator door is opened, and someone gets on or off the elevator. After a period of time, the elevator door control signal changes from a low level to a high level, indicating that the elevator door has been closed and the elevator continues to operate.

In this embodiment, it may be determined whether the change in the elevator door control signal conforms to a change rule of the elevator door control signal when the elevator normally operates as shown in FIG. 3 according to the changes in the elevator operation signal and the elevator door control signal, and if not, it may be determined that there is an elevator door fault in the elevator.

Most of the elevator door-opening operation faults in the past are caused by short circuits of electrical safety circuits according to the analysis for their causes. Some short circuits of the electrical safety circuits are caused by human factors, such as human short-circuiting of the electrical safety circuits when the elevator is repaired. Or, some short circuits are caused by non-human factors, such as short-circuiting caused by wet weather.

Figure 4:
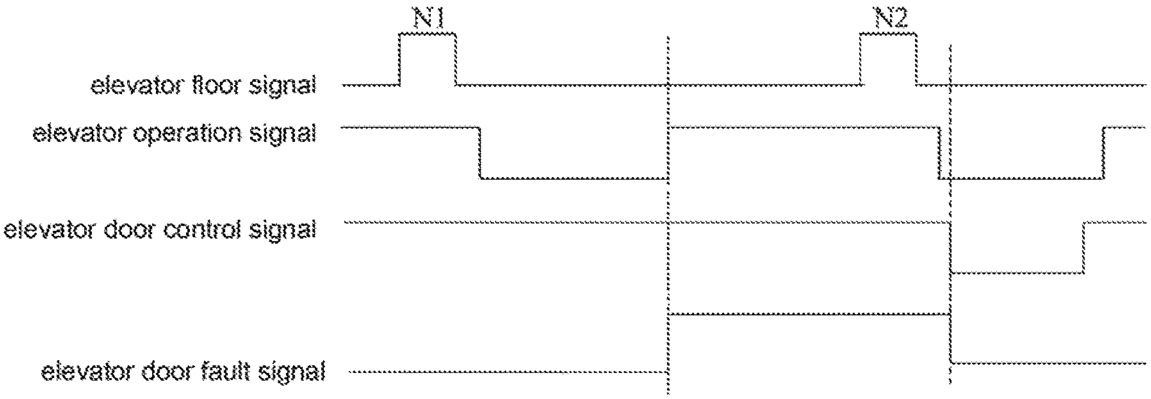
FIG. 4 is a schematic diagram of a change in elevator control signals when there is an elevator door fault in an elevator in an embodiment of the present invention.

Among them, if there are short circuits of the electrical safety circuits and other problems in the elevator, after the elevator stops in place, it is unnecessary for obtaining an elevator door-opening signal. The elevator door control signal is always in a high level. Particularly, reference is made to FIG. 4, which is a schematic diagram of a change in elevator control signals when there is an elevator door fault in an elevator in an embodiment of the present invention. In FIG. 4, when the elevator operation signal changes from a high level to a low level, it indicates that the elevator enters a stop state from an operation state, and when the elevator operation signal changes from the low level to the high level, it indicates that the elevator returns from the stop state to the operation state. If the elevator operation signal is within a time period of the low level and the elevator door control signal remains at the high level, it may be confirmed that there is the elevator door fault. At this time, the elevator door fault signal changes from the low level to the high level. It may be considered that the elevator door fault is repaired until it is detected that the elevator enters the stop state and the elevator door control signal changes from the high level to the low level. By this time, the elevator door fault signal changes from the high level to the low level.

Based on the above principle, in the above step 102, the step of monitoring whether there is an elevator door fault in the elevator based on the elevator operation signal and the elevator door control signal includes:

step a, monitoring a working state of the elevator based on the elevator operation signal;

step b, detecting a change in the elevator door control signal during a time period from the time when the elevator enters a stop state from an operation state to the time when the elevator returns from the stop state to the operation state; and step c, determining whether there is an elevator door fault in the elevator according to the change in the elevator door control signal during the time period and the elevator floor signal.

Among them, when the elevator door control signal remains at the high level during the above time period, it may be determined that there is the elevator door fault.

Further, after it is determined that there is the fault in the elevator door, the operation speed of the elevator is determined based on the above-mentioned elevator floor signal. When the operation speed of the elevator is greater than a preset operation speed threshold, it is determined that there is the elevator door fault.

Figure 5:
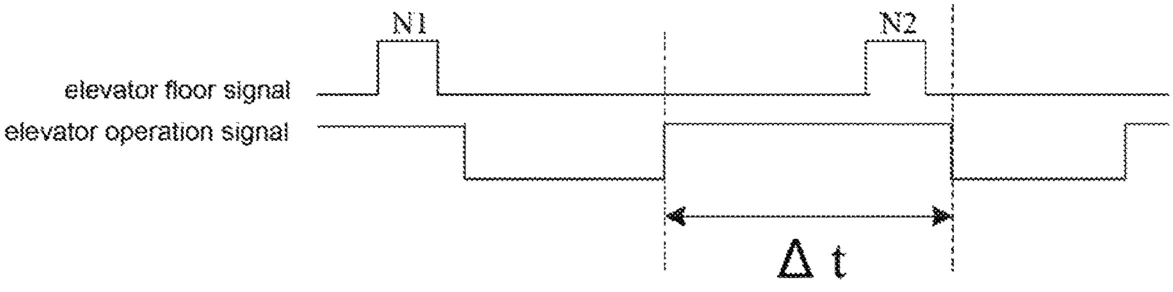
FIG. 5 is a schematic diagram of another change in elevator control signals when an elevator operates in an embodiment of the present invention.

For a better understanding of the embodiment of the present invention, reference is made to FIG. 5, which is a schematic diagram of a change in elevator control signals when an elevator operates in an embodiment of the present invention.

In FIG. 5, the elevator operation time is $\Delta t$ from the time when the elevator operation signal starts from a low level to a high level to the time when the elevator operation signal becomes the low level again. The elevator operates from a floor N1 to a floor N2. If the floor height is H, then the distance the elevator operates is $L=(N2-N1)*H$. The operation speed of the elevator may be calculated according to the above distance and time: $V=L/\Delta t$.

Among them, if the speed V is greater than a preset operation speed threshold (an overhaul speed threshold), indicating that the elevator is in a non-overhaul state, then the elevator operates at high speed. At this time, it may be determined that there is an elevator door fault in the elevator, and a serious safety hazard occurs at any time. Therefore, it is necessary for immediate warning.

In step 103, when there is an elevator door fault in the elevator and the elevator internal call signal is in a preset level state, it is determined that there is an elevator door-opening operation fault in the elevator.

Figure 6:
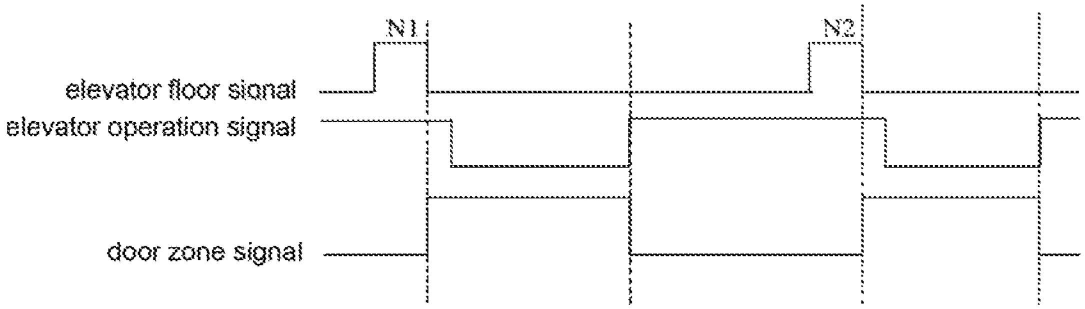
FIG. 6 is a schematic diagram of a change in a door zone signal when an elevator operates in an embodiment of the present invention.

Further, in order to determine whether the elevator operates while the elevator door is opened, in this embodiment, a door zone signal may be combined first, as shown in FIG. 6, which is a schematic diagram of a change in a door zone signal when an elevator operates in an embodiment of the present invention. When an elevator floor signal changes from a high level to a low level, the elevator stops operating first, an elevator operation signal changes from the high level to the low level, then the elevator starts operating again, and the elevator operation signal changes from the low level to the high level. A time period from the time when the elevator floor signal changes from the high level to the low level to the time when the elevator operation signal changes from the low level to the high level means that the elevator is located in an elevator door zone of any floor, and thus the door zone signal is formed.

Figure 7:
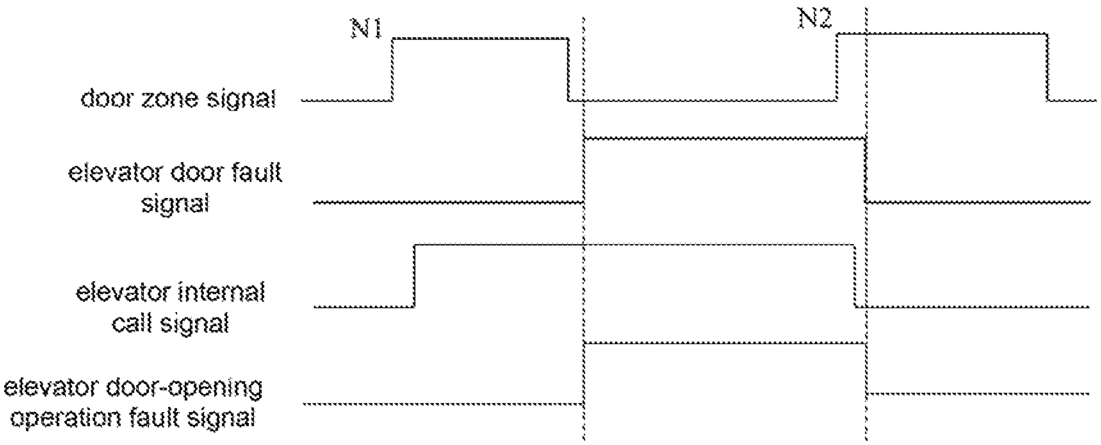
FIG. 7 is a schematic diagram of a change in an elevator door-opening operation fault signal when an elevator operates in an embodiment of the present invention.

Further, according to the door zone signal and an elevator internal call signal, it may be determined whether the elevator operates while the elevator door is opened. If the elevator is in the door zone, an internal call signal appears, indicating that someone walks into the elevator and presses a call button of a certain floor, and that the elevator door is opened. When the door zone signal changes from the high level to the low level, it indicates that the elevator starts to operate. During this period, because there is an elevator door fault in the elevator, it may be determined that the elevator is in a door-opening operation state, that is, there is an elevator door-opening operation fault in the elevator. Particularly, reference may be made to FIG. 7, which is a schematic diagram of a change in an elevator door-opening operation fault signal when an elevator operates in an embodiment of the present invention.

The present invention discloses a method for monitoring an elevator door-opening operation fault. The method includes: acquiring elevator control signals from a serial interface between an elevator controller and a control box by using a preset data acquisition device, wherein the elevator control signals include an elevator operation signal, an elevator door control signal, an elevator internal call signal and an elevator floor signal; based on the elevator operation signal, the elevator door control signal and the elevator floor signal, monitoring whether the elevator has an elevator door fault; when the elevator has the elevator door fault and the elevator internal call signal is in a preset level state, determining that there is an elevator door-opening operation fault in the elevator. Accordingly, the present invention may accurately detect the elevator door-opening operation fault by acquiring the elevator control signals from the serial interface between the elevator controller and the control box without additionally installing an elevator door detector, and is lower in use cost. Meanwhile, since the elevator controller generally has a unified serial interface, the present invention may be easily popularized and applied.

Figure 8:
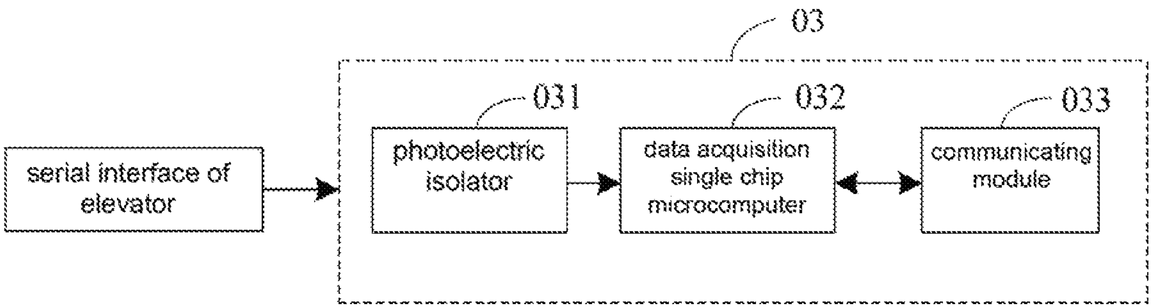
FIG. 8 is a schematic diagram showing a structure of a data acquisition device 03 in an embodiment of the present invention.

Further, based on the above embodiment, reference is made to FIG. 8, which is a schematic diagram showing a structure of a data acquisition device 03 in an embodiment of the present invention. In the embodiment of the present invention, the data acquisition device 03 includes a photoelectric isolator 031 and a data acquisition single chip 032, wherein a serial interface, the photoelectric isolator 031 and the data acquisition single chip 032 are sequentially connected.

Among them, in the above step 101, the elevator control signals are acquired from the serial interface of the elevator controller by using the preset data acquisition device. Particularly, the step 101 includes:

acquiring the elevator control signals from the serial interface by a data acquisition single chip microcomputer 032, wherein the elevator control signals are transmitted from the serial interface to the data acquisition single chip microcomputer 032 after passing through the photoelectric isolator 031.

Among them, the photoelectric isolator 031 may realize the unidirectional transmission of the signals, and the signals may only be output, but not input, that is, the signals in the data acquisition device 03 may not be transmitted to the serial interface by the photoelectric isolator 031. Accordingly, the data acquisition device 03 is prevented from generating an impact on the elevator.

Among them, the data acquisition single chip microcomputer 032 may employ STC89C52RC. A more important feature of this single chip microcomputer is that it has two frequency-reduction coefficients of traditional 12 frequency division and 6 frequency division, strong encryption capability, enhanced watchdog counter, low power consumption and low cost.

In addition, the data acquisition device 03 further includes a communicating module 033, such as an NBIOT (Narrow Band Internet of Things) module, which performs control by employing an AT command via a serial interface.

A group of serial interfaces of the data acquisition microcomputer 032 is connected with a serial interface of the elevator through the photoelectric isolator 031 for acquiring elevator control signals. Another group of serial interfaces of the data acquisition single chip microcomputer 032 is connected with a communicating module 033, and the communication module 033 is configured to transmit the elevator control signals acquired by the data acquisition single chip microcomputer 032 to a data center of a monitoring system in real time.

In the method for monitoring the elevator door-opening operation fault provided by the embodiment of the present invention, the data acquisition device includes a photoelectric isolator and a data acquisition single chip microcomputer, and the serial interface, the photoelectric isolator and the data acquisition single chip microcomputer are sequentially connected, that is, the data acquisition device is only configured to acquire the elevator control signals from the serial interface of the elevator without generating any impact on the normal operation of the elevator.

Further, based on the above embodiment, in the embodiment of the present invention, after it is determined that there is the elevator door-opening operation fault in the elevator, the above method for monitoring the elevator door-opening operation fault further includes:

triggering a preset warning apparatus, and/or transmitting preset warning information to an associated rescue system.

In the embodiment of the present invention, after it is determined that there is the elevator door-opening operation fault in the elevator, the preset warning apparatus is triggered immediately, or the preset warning information is transmitted to the associated rescue system, or the preset warning information is transmitted to the associated rescue system while the preset warning apparatus is triggered. Accordingly, the relevant rescue personnel may find the elevator door-opening operation fault for the first time, and deal with it in time (perform rescue).

Accordingly, the method for monitoring the elevator door-opening operation fault provided by the embodiment of the present invention may immediately trigger the preset warning apparatus and/or transmit the preset warning information to the associated rescue system after determining that there is the elevator door-opening operation fault, thereby enabling the relevant rescue personnel to find the elevator door-opening operation fault for the first time and deal with it in time (perform rescue).

Particularly, the method for monitoring the elevator door-opening operation fault provided by the embodiment of the present invention has the following advantages:

1, only monitor and no control: the data acquisition device acquires the elevator control signals via the serial interface of the elevator system in a one-way photoelectric isolation manner, and external signals will not be fed back to the elevator system, so that no impact on the operation of an original elevator system will be generated, which addresses the elevator manager's concerns about installing the data acquisition device;

2, low construction and installation costs: because there is no need for using a large number of sensors to acquire fault data of the elevator, the method is low in construction cost, convenient to install, and beneficial to popularization and use;

3, higher fault determination rate: the elevator control signals are acquired from the serial interface of the elevator controller, operation data of the elevator may be acquired accurately in real time, and the manufacturer may not conceal a fault signal, so that the fault determination success rate is high; and 4, higher applicability: since most of elevators have data interfaces for the control box and the controller, and in order to enable long-distance transmission, the serial interface is generally used to transmit the signals, and therefore, the method provided in the present invention may be suitable for most of the elevators.

Figure 9:
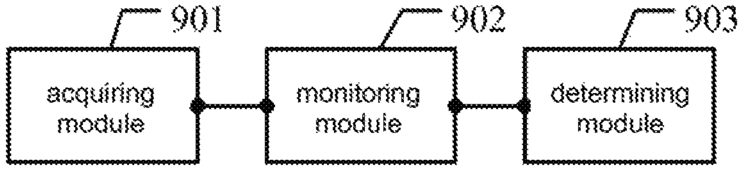
FIG. 9 is a schematic diagram showing a program module of an apparatus for monitoring an elevator door-opening operation fault in an embodiment of the present invention.

Furthermore, an embodiment of the present invention further provides an apparatus for monitoring an elevator door-opening fault. Reference is made to FIG. 9, which is a schematic diagram showing a program module of an apparatus for monitoring an elevator door-opening operation fault in an embodiment of the present invention. The apparatus for monitoring the elevator door-opening operation fault includes:

an acquiring module 901, which is configured to acquire elevator control signals from a serial interface between an elevator controller and a control box by using a preset data acquisition device, wherein the elevator control signals include an elevator operation signal, an elevator door control signal, an elevator internal call signal and an elevator floor signal;

a monitoring module 902, which is configured to monitor whether there is an elevator door fault in an elevator based on the elevator operation signal, the elevator door control signal and the elevator floor signal; and a determining module 903, which is configured to: when there is the elevator door fault in the elevator and the elevator internal call signal is in a preset level state, determine that there is an elevator door-opening operation fault in the elevator.

The present invention provides an apparatus for monitoring an elevator door-opening operation fault, which may realize the following steps: acquiring elevator control signals from a serial interface between an elevator controller and a control box by using a preset data acquisition device, wherein the elevator control signals include an elevator operation signal, an elevator door control signal, an elevator internal call signal and an elevator floor signal; monitoring whether the elevator has an elevator door fault based on the elevator operation signal, the elevator door control signal and the elevator floor signal; and when the elevator has the elevator door fault and the elevator internal call signal is in a preset level state, determining that there is an elevator door-opening operation fault in the elevator. Accordingly, the present invention may accurately detect the elevator door-opening operation fault by acquiring the elevator control signals from the serial interface between the elevator controller and the control box without additionally installing an elevator door detector, and is lower in use cost. Meanwhile, since the elevator controller generally has a unified serial interface, the method may be easily popularized and applied.

Figure 10:
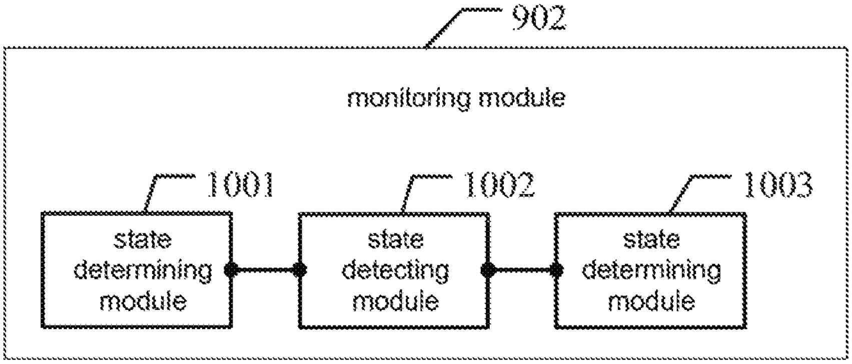
FIG. 10 is a schematic diagram showing details of a program module of a monitoring module 902 in an embodiment of the present invention.

Furthermore, based on the above embodiment, Reference is made to FIG. 10, which is a schematic diagram showing details of a program module of a monitoring module 902 in an embodiment of the present invention. In the embodiment of the present invention, the above monitoring module 902 specifically includes:

a state determining module 1001, which is configured to monitor a working state of the elevator based on the elevator operation signal; and a signal detecting module 1002, which is configured to detect a change in the elevator door control signal during a time period from the time when the elevator enters a stop state from an operation state to the time when the elevator returns from the stop state to the operation state; and a signal determining module 1003, which is configured to determine whether there is an elevator door fault in the elevator according to the change in the elevator door control signal during the time period and the elevator floor signal.

Optionally, the signal determining module 1003 includes:

a speed detecting and determining module, which is configured to determine an operation speed of the elevator based on the elevator floor signal; and a second determining module, which is configured to: when determining that a level state of the elevator door control signal remains unchanged during the time period and the operation speed of the elevator is greater than a preset operation speed threshold, determine that there is an elevator door fault in the elevator.

Optionally, the apparatus further includes:

a warning module, which is configured to trigger a preset warning apparatus, and/or transmit preset warning information to an associated rescue system after determining that there is the elevator door-opening operation fault in the elevator.

Accordingly, the apparatus for monitoring the elevator door-opening operation fault provided by the embodiment of the present invention may immediately trigger the preset warning apparatus and/or transmit the preset warning information to the associated rescue system after determining that there is the elevator door-opening operation fault in the elevator, thereby enabling the relevant rescue personnel to find the elevator door-opening operation fault for the first time and deal with it in time (perform rescue).

In the several embodiments provided in the present invention, it should be understood that the disclosed apparatus and method may be implemented in other ways. For example, the apparatus embodiments described above are only schematic. For example, the modules are only divided according their logical functions. In an actual implementation, the modules are divided in other ways, for example, multiple modules or components may be combined or may be integrated into another system, or some features may be ignored or not implemented. In addition, the displayed or discussed mutual coupling or direct coupling or communication connection may be indirect coupling or communication connection via some interfaces, apparatuses or modules, and may be in electrical, mechanical, or other forms.

Modules described as separate components may or may not be physically separated, and components displayed as modules may or may not be physical modules, that is, they may be located in one place, or may be distributed across multiple network modules. Some or all of the modules may be selected according to actual needs to achieve the purpose of the solution of this embodiment.

In addition, each functional module in each embodiment of the present invention may be integrated into one processing module, or each module may exist alone physically, or two or more modules may be integrated into one module. The above integrated modules may be implemented in the form of hardware or implemented in the form of a software function module.

If the integrated module is implemented in the form of the software function module and sold or used as an independent product, it may be stored in a computer-readable storage medium. Based on such an understanding, the technical solution of the present invention essentially or a part of the contribution to the prior art or all or a part of the technical solution may be embodied in the form of a software product. The computer software product is stored in a storage medium, and includes several instructions to enable a computer device (which may be a personal computer, a server, or a network device, etc.) to perform all or a part of the steps of the methods described in various embodiments of the present invention. The foregoing storage medium includes a U disk, a mobile hard disk, a read-only memory (ROM), a random access memory (RAM), a magnetic disk or an optical disk and other media that may store a program code.

It should be noted that, for the convenience of description, the foregoing method embodiments are all expressed as a series of action combinations, but those skilled in the art should know that the present invention is not limited by the sequence of actions described because certain steps may be performed in other orders or simultaneously according to the present invention. Secondly, those skilled in the art should be understood that the embodiments described in the description are all preferred embodiments, and the actions and modules involved are not necessarily required by the present invention.

The above embodiments are differently described. For a part that is not detailed in a certain embodiment, reference is made to the related description of other embodiments.

The above is a description of a method and an apparatus for monitoring an elevator door-opening fault provided by the present invention. For those skilled in the art, according to the concept of the embodiments of the present invention, there are changes in specific implementations and application scopes. In summary, the content of the description should not be construed as limiting the present invention.

The invention claimed is:

1. A method for monitoring an elevator door-opening operation fault, comprising:

acquiring elevator control signals from a serial interface between an elevator controller and a control box by using a preset data acquisition device, wherein the elevator control signals comprise an elevator operation signal, an elevator door control signal, an elevator internal call signal and an elevator floor signal;

monitoring whether there is an elevator door fault in an elevator based on the elevator operation signal, the elevator door control signal and the elevator floor signal; and determining that there is the elevator door-opening operation fault in the elevator when there is the elevator door fault in the elevator and the elevator internal call signal is in a preset level state.

2. The method according to claim 1, wherein the step of monitoring whether there is an elevator door fault in an elevator based on the elevator operation signal, the elevator door control signal and the elevator floor signal comprises:

monitoring a working state of the elevator based on the elevator operation signal;

detecting a change in the elevator door control signal during a time period from the time when the elevator enters a stop state from an operation state to the time when the elevator returns from the stop state to the operation state; and determining whether there is an elevator door fault in the elevator according to the change in the elevator door control signal during the time period and the elevator floor signal.

3. The method according to claim 2, wherein the determining whether there is an elevator door fault in the elevator according to the change in the elevator door control signal during the time period and the elevator floor signal comprises:

determining an operation speed of the elevator based on the elevator floor signal; and determining that there is an elevator door fault in the elevator when determining that a level state of the elevator door control signal remains unchanged during the time period and the operation speed of the elevator is greater than a preset operation speed threshold.

4. The method according to claim 1, wherein the data acquisition device comprises a photoelectric isolator and a data acquisition single chip microcomputer, wherein the serial interface, the photoelectric isolator and the data acquisition single chip microcomputer are sequentially connected;

the step of acquiring elevator control signals from a serial interface between an elevator controller and a control box by using a preset data acquisition device comprises:

acquiring the elevator control signals from the serial interface by the data acquisition single chip microcomputer, wherein the elevator control signals are transmitted from the serial interface to the data acquisition single chip microcomputer after passing through the photoelectric isolator.

5. The method according to claim 1, wherein after the step of determining that there is a door-opening operation fault in the elevator, the method further comprises:

triggering a preset warning apparatus, and/or transmitting preset warning information to an associated rescue system.

6. An apparatus for monitoring an elevator door-opening operation fault, comprising:

an acquiring module, which is configured to acquire elevator control signals from a serial interface between an elevator controller and a control box by using a preset data acquisition device, wherein the elevator control signals comprise an elevator operation signal, an elevator door control signal, an elevator internal call signal and an elevator floor signal;

a monitoring module, which is configured to monitor whether there is an elevator door fault in an elevator based on the elevator operation signal, the elevator door control signal and the elevator floor signal; and a determining module, which is configured to: when there is the elevator door fault in the elevator and the elevator internal call signal is in a preset level state, determine that there is an elevator door-opening operation fault in the elevator.

7. The apparatus according to claim 6, wherein the monitoring module comprises:

a state determining module, which is configured to monitor a working state of the elevator based on the elevator operation signal;

a signal detecting module, which is configured to detect a change in the elevator door control signal during a time period from the time when the elevator enters a stop state from an operation state to the time when the elevator returns from the stop state to the operation state; and a signal determining module, which is configured to determine whether there is an elevator door fault in the elevator according to the change in the elevator door control signal during the time period and the elevator floor signal.

8. The apparatus according to claim 7, wherein the signal determining module comprises:

a speed detecting and determining module, which is configured to determine an operation speed of the elevator based on the elevator floor signal; and a second determining module, which is configured to: when determining that a level state of the elevator door control signal remains unchanged during the time period and the operation speed of the elevator is greater than a preset operation speed threshold, determine that there is an elevator door fault in the elevator.

9. The apparatus according to claim 6, wherein the data acquiring device comprises a photoelectric isolator and a data acquisition single chip microcomputer, wherein the serial interface, the photoelectric isolator and the data acquisition single chip microcomputer are sequentially connected;

the acquiring module is specifically configured to:

acquire the elevator control signals from the serial interface by the data acquisition single chip microcomputer, wherein the elevator control signals are transmitted from the serial interface to the data acquisition single chip microcomputer after passing through the photoelectric isolator.

10. The apparatus according to claim 6, further comprising:

a warning module, which is configured to trigger a preset warning apparatus, and/or transmit preset warning information to an associated rescue system after determining that there is the elevator door-opening operation fault in the elevator.

* * * * *